United States Patent [19]

Hodgson et al.

[11] Patent Number: 4,824,683

[45] Date of Patent: Apr. 25, 1989

[54] LOW CALORIE HIGH FIBER BREAD

[75] Inventors: William W. Hodgson, West Chester, Pa.; Tom R. Watkins, New York, N.Y.

[73] Assignee: Nutri-Life Foods, Inc., West Chester, Pa.

[21] Appl. No.: 83,863

[22] Filed: Aug. 7, 1987

Related U.S. Application Data

[63] Continuation of Ser. No. 860,999, May 8, 1986.

[51] Int. Cl.$^4$ ............................................. A21D 2/00
[52] U.S. Cl. ...................................... 426/62; 426/550; 426/555; 426/622; 426/653
[58] Field of Search ............... 426/549, 551, 550, 622, 426/653, 19, 62, 554, 555, 804

[56] References Cited

U.S. PATENT DOCUMENTS 4,711,786  12/1987  Schmidt ............................. 426/634

*Primary Examiner*—Donald E. Czaja
*Assistant Examiner*—Carolyn Paden
*Attorney, Agent, or Firm*—Steele, Gould & Fried

[57] ABSTRACT

A composition for use in making a low calorie and high fiber content bread product as a replacement of a portion of the conventional dough ingredients comprising a mixture of pre-gelatinized pea bran, pre-gelatinized oat bran and, optionally, soy flour, and the bread products thereof.

10 Claims, No Drawings

LOW CALORIE HIGH FIBER BREAD

This is a continuation of application Ser. No. 860,999, filed May 8, 1986.

BACKGROUND OF THE INVENTION

1. Field of the Invention

The present invention relates to food products and more particularly to a low calorie fiber fortified bread. The term "bread" as used herein is intended to refer to breads broadly with reference to the product commonly and generally known as bread by the layman including specialty and variety breads.

2. Background of the Invention

Among the numerous non-assimilated carbohydrate materials proposed in food formulations such as low calorie bread is purified cellulose that has been subjected to acid hydrolysis as described in U.S. Pat. No. 3,023,104. The material described in the patent is believed to be identical with the product now being sold under the trademark Avicel by the FMC Corporation, American Viscose Division of Philadelphia, Pennsylvania. Avicel, an alphacellulose material, has been tried experimentally in making bread but is quite expensive. In addition, Avicel has a tremendous absorbing capacity for water. Moreover, if enough Avicel is used to produce a 25 percent calorie reduction, a commercially satisfactory finished product cannot be produced using standard dough formulations or any dough formula.

U.S. Pat. No. 3,348,951 describes the production of dietetic baking products including bread in which ground nut protein or wheat bran is used to partially or completely replace starch. Ground nut protein is expensive and wheat bran contains a good deal of nutritive material. Accordingly, its calorie lowering capabilities are limited.

U.S. Pat. No. 4,109,018 discloses a low calorie white bread formulation which includes flour and utilizes wheat bran as a coarsening agent. It was noted that use of bran of about 6% results in a dark colored loaf and did not result in suitable bread consistency.

U.S. Pat. No. 4,237,170, which is herein incorporated by reference discloses a high fiber bread which utilizes as the fiber component field pea hulls. The product, however, has a bitter taste from the pea hulls.

U.S. Pat. No. 4,301,179, which is herein incorporated by reference relates to a bread dough for standard white bread which incorporates pea bran in an amount of about 2% to 3%. Larger amounts were stated to cause the bread to lose its white bread consistency.

Other non-nutritive food substances such as rice hulls, corn cobs, bean nulls, etc. have been proposed for use separately but not in conjunction with one another in making biscuits or crackers. Biscuits and crackers are, however, hard and usually friable. Accordingly, performance requirements are relatively easy to meet. Moreover, gas development and expansion of the dough is a relatively minor factor. In the case of bread, on the other hand, a smooth, light, and resilient texture is required. The volume must be high and the grain structure even. In addition, each loaf must retain just the proper resiliency and gas-holding ability while expanding during proofing and baking.

OBJECTS OF THE INVENTION

The present invention has among its objects the provision of an improved low calorie bread having the following characteristics and advantages: (a) a tender breadlike eating consistency, (b) the presence of substantially non-nutritive edible material in amounts great enough to reduce the calorie content of the bread, (c) an ability to be manufactured using standard bakery procedure and to remain fresh during shipment and storage to retail outlets at least as well as conventional bread, and (d) the provision of a highly nutritional low calorie bread product which is low in cost and has the pleasing aroma, flavor and texture characteristic of bread.

It is also an object of the present invention to provide a high fiber bread in which the fiber content is both biologically active and compatible in appearance with a baked white bread.

It is a still further object of the invention to provide a bread with a high pea bran content and oat bran content that has the consistency of conventional bread and free of a bitter aftertaste.

It is an additional object of the invention to provide a diet bread formulation which is compatible with standard bread ingredients, such as yeast, salt, fermentable sugars, vitamins, mold inhibitors, yeast food, and the like.

The present invention is also directed to a natural fiber-supplemented, low calorie bread product formed by processing and baking the above-described dough formulation.

It is understood that the term "pea bran" as used herein relates to the seed coat of peas which is recovered by decorticating (peeling off the seed coat) the pea mechanically. This fraction does not contain the germ (containing much of the soluble dietary fiber). This bran fraction contains as much as 90% total dietary fiber, 70–80% which is insoluble dietary fiber (cellulose, hemicellulose).

Pea bran is available from Dupro Division of the Dumas Corporation which recovers pea fiber from the mechanical splitting of dried field peas. This byproduct contains the seed coat as well as the germ and underlying layers of the seed coat. This fiber fraction contains approximately 60–64% total dietary fiber (soluble to insoluble fiber ratio of 50:50) as well as 14–16% high lysine protein and 12–15% complex carbohydrate and starch.

The pea fiber fraction recovered from the mechanical splitter is very coarse in structure and is generally ground to a workable particle size distribution in a hammer mill, but never to a "flour" state. The term "flour" refers to a particle size distribution of at least 80% passing through a U.S. Sieve Standard No. 100 (149 microns).

The term "pregelatinized" refers to the physical complexing of the components of the oat or pea bran as a result of grinding the whole oat or pea that have been cooked in a rotary retort fitted with a stainless steel sleeve. The residence time in the cooker is usually about 6–7 minutes at about 267° F. Upon removal from the cooker, the pea or oat is placed into a grinding mill to be cooled while grinding. There is no rearrangement of components or moisture transfer during the cooking and subsequent grinding process.

SUMMARY OF THE INVENTION

Briefly, the present invention provides a bread product having the aroma and tender eating characteristics of bread and the capability of being manufactured and distributed in the same manner as conventional bread as well as a reduction of available calories compared with conventional bread. According to the invention, a composition for use in the making of high fiber content bread contains the usual baker's flour and about 10 ∝ 40 parts by weight based on flour (baker's flour) of pre-gelatinized pea bran and 10–40 parts by weight based on flour of pre-gelatinized oat bran. Optionally, it is possible to use in lieu of a portion of either or both of pea bran and oat bran up to about 5 parts based on flour of soy flour.

The bread product is further composed of conventional materials such as sugar, water, leavening, and optionally, gluten, flavoring and coloring.

DESCRIPTION OF THE PREFERRED EMBODIMENT

The major ingredients present in the compositions embodying the present invention are flour, pre-gelatinized pea bran and pre-gelatinized oat bran, sugar, water, and leavening. A great many minor ingredients can be employed to provide optimum performance and to impart special characteristics. These include flavors, egg yolk for tenderizing the dough, emulsifiers which produce tenderness, gluten for the purpose of strengthening the dough and making it more resilient, yeast food, an antimycotic agent and color among others. Color, flavor and egg yolk are used in conventional amounts, emulsifiers such as a glyceride bread emulsifier is used in the amount of about 4 parts for each 100 parts of flour and gluten is used in amounts from zero to about 15 parts for each 100 parts of flour, but preferably, from about 5 parts to about 13.5 parts for each 100 parts of flour.

The use of pea bran and oat bran separately in the making of bread products in known. Both are utilized in the dough formulations in small amounts because in large amounts they produce a deleterious effect on the bread characteristics. Oat bran has been traditionally utilized in amounts up to about 6% because it is a coarsening agent and affects the crumb characteristics and the texture of the bread. It is usually added, primarily because of its flavor and texture, not for its specific health benefits.

Pea bran is also utilized in the manufacture of bread products because of its high fiber content. However, ordinary pea bran has the drawback of having a bitter taste.

The combination of high amounts of ordinary pea bran and oat bran results in a coarse bread product which results in poor volume.

It has now been found that the beneficial properties of pea bran and oat bran can be incorporated into a bread product without their disadvantages by pre-gelatinizing the pea bran and oat bran prior to use. The pre-gelatinizing pea bran is devoid of the previous existing bitter taste and can be readily formulated into dough.

First with reference to sugar, it has been found that from about 5 to about 15 parts sugar can be used for each 100 parts of flour but preferably from about 5 to about 11 parts is used. If too little sugar is employed, the yeast action may be inhibited and the bread will suffer from poor volume. If too much is employed, the taste may be too sweet and the caloric content excessive. The function of the sugar is primarily for yeast action and flavoring and thus allows more pre-gelatinized pea bran and oat bran to be added.

A great many of minor ingredients may be employed to provide optimum performance and to impart special characteristics although they are not necessary. These include flavors, egg yolk for tenderness, gluten for purpose of strengthening the dough and making it more resilient, yeast food, anti-mycotic agents and colors among others.

The use of a water dispersible hydrophilic gum in the dough formulation aids in improving the dough-like characteristics of the batter and to permit better handling of the dough in large scale productions. Suitable gums include Xanthan, Guar and Tragacanth. One skilled in the art can readily determine the functionality of the gum component of the formulation of the invention. Amounts up to about 2 parts by weight per 100 parts of flour can be used.

A dry mix of the above type may also be prepared in which only part of the total amount of ingredients are present, e.g. a mix containing 10–30 parts of pre-gelatinized pea bran (based on weight of pre-gelatinized pea bran and pre-gelatinized oat bran), 10–20 parts of oat bran (based on weight of said pea bran and oat bran), and optionally up to 6 parts of soy flour, with the commercial baker's flour being added later.

There is, of course, no lower limit in the amount of pre-gelatinized pea bran and pre-gelatinized oat bran that can be employed in accordance with the invention since any amount of added pre-gelatinized pea bran and pre-gelatinized oat bran has a small but measurable effect in reducing the bioavailable caloric content of the bread. However, based upon dietary requirements as well as caloric reduction, at least 10 percent, and preferably more than 25 percent are desired.

The ratio of pre-gelatinized pea bran to pre-gelatinized oat bran can vary from about 20 percent to 80 percent, respectively, or from about 80 percent to 20 percent, respectively, when a relatively minor caloric reduction is to be achieved, e.g. 15 percent. When a higher bioavailable caloric reduction is desired by addition of vegetable brans, e.g. 20 percent or more with improved bread characteristics the ratio should be from about 80 percent pea bran to 20 percent oat bran to 60 percent to 40 percent respectively. In general, the best results in bread characteristics are usually obtained with about two parts of pre-gelatinized pea bran to about one part of pre-gelatinized oat bran.

To prepare the formulation, the pea bran and oat bran are dried, to 8½ percent and 10 percent moisture respectively, cleaned and ground into a size similar to that of flour, for example from about 5 to 160 microns. They can be ground to an average particle size below about 20 microns and are typically ground to an average particle size of about 5 to 25 microns in diameter. The particles preferably have an average diameter below 10 microns. The pea bran and oat bran are then pre-gelatinized by a process entitled "Pulvochron" of Dumas Seed Company.

Both of the pre-gelatinized products are commercially available. Pre-gelatinized oat bran is a product of National Oats Corporation.

The present invention allows bread formulations to be made which supplement the dough system to reduce the caloric content from only a small amount to as much as 35 percent compared with the same formulations not utilizing the invention depending upon the amount of pre-gelatinized pea bran and oat bran that are used, and in part, upon the relative amounts of sugar and other constituents.

An important aspect of the present invention is the fact that it can be compounded using conventional methods, for example, the straight dough or sponge process. For every 100 parts of solids in the dough, there is usually about 60 to 85 and preferably from 68 to 80 parts of water in the dough before baking. The final moisture content of the bread is about the same as a conventional bread. The amount of water used in the composition before baking has a great effect on achieving a favorable taste. If too little is used, the finished product tends to be hard, dry or have poor volume. If too much is used, the finished product may be too moist or have a poor structure or volume.

While the quantities of components present in the composition have been described above, it has also been found that to obtain the best volume, texture, symmetry, break, grain description and aroma as well as the best eating qualities, the relative proportions of the ingredients as well as their quantities with relationship to the amount of flour are significant. Accordingly, the effect of changing the most significant of these relationships will be described hereinbelow for the sake of completeness. It should be understood that these proportions apply in the specific application of the invention to the formulation of a high volume bread containing the following ingredients: flour, gluten, a combination of pre-gelatinized pea bran and pre-gelatinized oat bran, sugar, a monoglyceride emulsifier, yeast leavening, water and optionally, soy flour, color and flavor.

The following examples are illustrative of the invention and are not intended to be limiting. It is evident to one skilled in the art that the ingredients of the various compositions illustrated, their relative proportions and amounts, as well as other variables and parameters can be modified while being within the scope and the contemplation of the invention, and that the equivalents of what is disclosed herein are also contemplated to be within the scope of the invention

EXAMPLE I

A. A Preparation of Pre-mix, amount shown being based on parts by weight of pea bran, oat bran and soy flour:

| Ingredient | Amount |
|---|---|
| Pea Bran (Pre-gelatinized) | 31 |
| Oat Bran (Pre-gelatinized) | 16 |
| Soy Flour | 3 |
| Lechitin (Dry) | .75 |
| Gluten | 3.75 |
| Yeast Food (D.S.) | .25 |
| Salt | 1.5 |
| Calcium Sulphate | 1.5 |
| Mono-Calcium Acid Phosphate | .25 |
| Malt - (Dry) - Diastatic | .75 |
| Malt - (Dry) - Non-Diastatic | 1.0 |
| Gum - Xanthan | .15 |
| Diacetyl Tartaric Acid Ester of Mono and Diglycerides | .25 |

All of the ingredients were mixed in a Hobart mixer to obtain an even mix.

B. Preparation of Bread Dough Formulation, amount shown being based on parts by weight of bread flour:

| Ingredient | Amount |
|---|---|
| Bread Flour | 100 |
| Mix of Part A | 60 |
| Gluten | 5 |
| Compressed Yeast | 6 |
| Molasses (Liquid) | 2 |
| Brown Sugar | 6 |
| Vegetable Oil | 2 |
| Ethoxylated mono glyceride | 1 |
| Salt | 1.5 |
| Vinegar (200 gr.) | 1 |
| Water | 115 |

All of the dry ingredients were mixed in a Hobart mixer. Then the remaining ingredients were added and mixing was continued for about 15 minutes. The dough was then placed in a fermentation cabinet at 85° to 90° F. and 82 to 84 percent relative humidity for one hour. It was then molded and placed in a proof cabinet and allowed to rise to about 4.5 inches. It was then placed in an oven for 25 to 30 minutes at 420° F. to bake the high fiber, low calorie bread.

A similar product can be obtained by replacing the soy flour with an equal amount of pre-gelatinized pea bran and/or oat bran.

EXAMPLE II

Following the procedure of Example I, a high protein and high fiber low calorie bread is made as follows:

A. Preparation or Pre-mix

| Ingredient | Amount Based On Parts By Weight Of Pea Bran, Oat Bran And Soy Bran |
|---|---|
| Pea Bran (Pre-gelatinized) | 25 |
| Oat Bran (Pre-gelatinized) | 12 |
| Soy Flour | 2.83 |
| Lecitin (Dry) | .75 |
| Gluten | 3.75 |
| Yeast Food (D.S.) | .25 |
| Salt | 1.5 |
| Calcium Sulphate | 1.5 |
| Mono-Calcium Acid Phosphate | .25 |
| Malt - (Dry) - Diastatic | .75 |
| Malt - (Dry) - Non-Diastatic | 1.0 |
| Gum - Xanthan | .15 |
| Diacetyl Tartaric Acid Ester of Mono and Diglycerides | .25 |

B. Preparation of Bread Dough

| Ingredient | Amount Based On Parts By Weight Of Flour |
|---|---|
| Bread Flour - (Hi-Protein) | 100 |
| Mix from Part A | 50 |
| Gluten | 5 |
| Compressed Yeast | 5 |
| Molasses (Liquid) | 2 |
| Brown Sugar | 6 |
| Vegetable Oil | 2 |
| Ethoxylated mono glyceride | 1 |
| Salt | 1.5 |
| Vinegar (200 gr.) | 1 |
| Water | 105 |

The bread which is formed has a good aroma and consistency with an appearance of standard bread.

The above formulation may be varied to provide darker crumb colors, harsher and stronger flavors than the bread-like products described. Such technique is well known to bakers. It includes the introduction of relatively coarse wheat products such as cracked wheat, rolled wheat, whole wheat flour, bran and the like or similar ingredients derived from flax seed, sesame and other food seed products. Flavors and colors are altered commonly by the use of caramel and various spices, extracts and sours in relatively small amounts as required. Such formulas as these are commonly used both for "pan" and "hearth" breads.

EXAMPLE III

Following the procedure of Example I, a dough was prepared using the following ingredients:

A. Preparation of Pre-Mix

| Ingredient | Amount Based On Parts By Weight Of Pea Bran, Oat Bran And Soy Flour |
|---|---|
| Pea Bran (Pre-gelatinized) | 31 |
| Oat Bran (Pre-gelatinized) | 16 |
| Soy Flour | 3 |
| Lysine hydrochloride | .75 |
| Gluten | 3.75 |
| Yeast Food (D.S.) | .25 |
| Salt | 1.5 |
| Calcium Sulphate | 1.5 |
| Mono-Calcium Acid Phosphate | .25 |
| Malt - (Dry) - Diastatic | .75 |
| Malt - (Dry) - Non-Diastatic | 1.0 |
| Gum - Guar | .15 |
| Diacetyl Tartaric Acid Ester of Mono and Diglycerides - (DATEM) | .25 |

B. Preparation of Bread Dough

| Ingredient | Amount Based On Parts Of Weight Of Flour |
|---|---|
| Baker's Flour | 100 |
| Pre-Mix of Part A | 40 |
| Gluten | 5 |
| Yeast | 6 |
| Molasses (Liquid) | 2 |
| Sucrose Corn Sugar | 6 |
| Vegetable Oil | 2 |
| Ethoxylated mono glyceride | 1 |
| Salt | 1.5 |
| Water | 110 |

While certain specific embodiments of the invention have been described with particularity herein, it should be recognized that various modifications thereof will occur to those skilled in the art. Therefore, the scope of the invention is to be limited solely by the scope of the claims appended hereto.

What is claimed is:

1. A composition for use in making a low calorie and high fiber content bread product which is free of a bitter after-taste comprising 100 parts flour, about 10 to 40 parts of pre-gelatinized pea bran based on flour, and 10 to 40 parts of pre-gelatinized oat bran based on flour.

2. The composition of claim 1 wherein up to about 5 parts of soy flour is present.

3. The combination of claim 1 wherein the ratio of said pea bran to said oat bran is about 2 to 1.

4. A dry mix for use in admixing with flour for making a bread product which is free of a bitter after-taste comprising pre-gelatinized pea bran, pre-gelatinized oat bran and soy flour, said mix based on 50 parts of said pea bran, oat bran and soy flour comprising 10–40 parts of pre-gelatinized pea bran, 10–30 parts of pre-gelatinized oat bran and up to 6 parts of soy flour.

5. The mix of claim 4 which comprises:
   about 25 parts by weight of pre-gelatinized pea bran,
   about 12 parts by weight of pre-gelatinized oat bran,
   about 3 parts by weight of soy flour,
   about 4 parts by weight of gluten, and
   about 0.3 parts by weight of yeast food.

6. A dough composition for making a bread product which is free of a bitter after taste, said dough composition comprising 100 parts of wheat flour, about 10 to 40 parts by weight of pre-gelatinized pea bran based on wheat flour, about 10 to 40 parts by weight of pre-gelatinized oat bran based on wheat flour, up to about 6 parts by weight of soy flour based on wheat flour and sufficient sugar, leavening, gluten and water to make a dough.

7. A baked low calorie bread which is comprised of the dough of claim 6.

8. In a method of making baked products from wheat flour having reduced calories and a high fiber content, the improvement comprising forming a dough formulation with the composition of claim 1.

9. In a method of making baked products from wheat flour having reduced calories and a high fiber content, the improvement comprising forming a dough formulation with the composition of claim 2.

10. In a method of making baked products from wheat flour having reduced calories and a high fiber content, the improvement comprising forming a dough formulation with the composition of claim 3.

* * * * *